US 6,642,505 B1

(12) United States Patent
Nakano et al.

(10) Patent No.: US 6,642,505 B1
(45) Date of Patent: Nov. 4, 2003

(54) REFLECTION-TYPE OPTICAL SENSOR

(75) Inventors: Yoichi Nakano, Narashino (JP); Akira Ito, Narashino (JP); Yasutoshi Chiba, Narashino (JP); Hiroshi Takahashi, Narashino (JP)

(73) Assignee: Seiko Precision Inc., Chiba-ken (JP)

( * ) Notice: Subject to any disclaimer, the term of this patent is extended or adjusted under 35 U.S.C. 154(b) by 0 days.

(21) Appl. No.: 09/616,389

(22) Filed: Jul. 14, 2000

(30) Foreign Application Priority Data

Jul. 16, 1999 (JP) ............................................. 11-202719

(51) Int. Cl.[7] ................................................ H01J 40/14
(52) U.S. Cl. ......................... 250/221; 250/239; 250/216
(58) Field of Search ................................. 250/221, 239, 250/222.1, 216, 226, 559.38; 356/3.01, 3.06

(56) References Cited

U.S. PATENT DOCUMENTS 5,383,034 A * 1/1995 Imamura et al. .......... 250/208.1
5,811,798 A * 9/1998 Maurin et al. ............... 250/239

FOREIGN PATENT DOCUMENTS

| DE | 2656185 | 6/1978 |
| DE | 19804684 | 2/1999 |
| EP | 0083431 | 7/1983 |
| JP | 8210840 A | * 8/1996 |

* cited by examiner

Primary Examiner—Kevin Pyo
(74) Attorney, Agent, or Firm—Adams & Wilks

(57) ABSTRACT

A reflection-type optical sensor is provided wherein misjudgment is prevented in detecting the existence of an object and determining whether a distance to the object is large or small. A housing is molded from white polycarbonate resin and has a light-projecting portion and a light-receiving portion. A light-projecting lens and a light-emitting device are mounted in a light-projecting chamber formed in the light-projecting portion. A light-receiving lens and a light-receiving device are mounted in a light-receiving chamber formed in the light-receiving portion. Those of the wall surfaces of the light-projecting chamber and the light-receiving chamber which are illuminated with light are light reflection-promoting surfaces that promote the reflection of light. The light reflection-promoting surfaces can be smooth surfaces, surfaces painted in white, inner surfaces of auxiliary members fabricated as separate parts from aluminum, or the like.

28 Claims, 5 Drawing Sheets

REFLECTION-TYPE OPTICAL SENSOR

FIELD OF THE INVENTION

The present invention relates generally to an optical sensor and, more particularly, to a reflection-type optical sensor having internal light reflection-promoting surfaces to provide improved detection capabilities.

BACKGROUND DISCUSSION

As shown in FIGS. 7(a) and 7(b), a reflection-type optical sensor has been used as a sitting sensor for a toilet seat device A that can function also as a bidet. The optical sensor detects whether or not a person a is seated on the toilet seat b. The sitting sensor d is mounted to a fixture c to which the toilet seat b is mounted. The sitting sensor d has a light-emitting device such as an infrared diode or the like (not shown) that emits light toward the seated person a via a light-projecting lens. Light reflected by the seated person a is received by a light-receiving device such as a single position-sensitive device (PSD) via a light-receiving lens spaced from the light-emitting device by a given distance. Where the level of light received by the light-receiving device is smaller than a predetermined value, the sensor judges that no one is seated. Where the received light level exceeds the predetermined value, the sensor judges that a person is seated.

Where the result of the decision is that no person is seated, the device is controlled so that no water is ejected from a water nozzle even if a nozzle switch is depressed. Normally, the sitting sensor d is accommodated and held in a housing or holder (not shown). The holder is typically made of a dark synthetic resin such as a black-colored resin. The wall surface of the chamber through which passes light projected by the light-emitting device and light received by the light-receiving device pass is embossed. A cover e is swingably connected to the fixture c.

In the above-described prior art sitting sensor, a part of the light projected by the light-emitting device is absorbed into the holder and the amount of projected light decreases due to the color of the holder, the material of the holder, or the surface treatment of the holder wall surface. If the object (person a) to be detected is wearing clothing of low reflectivity, such as black-colored clothing, a part of the light is absorbed by the clothing due to its color. Therefore, a sufficient amount of reflected light cannot always be obtained. The reflected light is also absorbed by the holder, resulting in additional attenuation. Further attenuation is caused by the embossing of the chamber wall surface. As a result, adequate light may not reach the light-receiving device. Hence, detection is not properly performed. In this case, the result of the decision may be that no human is seated. That is, an erroneous decision occurs. Particularly in cases where the object (person a) to be detected is very close to the sensor, if reflection occurs at a short distance and the beam of the reflected light blurs, the aforementioned problem becomes even more conspicuous. This makes it impossible to detect a person in a seated state, which leads to an erroneous decision.

SUMMARY OF THE INVENTION

In view of the foregoing shortcomings, an object of the present invention is to provide a reflection-type sensor with improved detection capabilities.

To achieve the foregoing object, the present invention provides a reflection-type optical sensor comprising a light-projecting portion and a light-receiving portion formed in a holder, a light-projecting lens and a light-emitting device disposed in a light-projecting chamber formed in the light-projecting portion, and a light-receiving lens and a light-receiving device disposed in a light-receiving chamber formed in the light-receiving portion. The light-projecting chamber and the light-receiving chamber have wall surfaces that receive incident light and are light reflection-promoting surfaces for promoting the reflection of light. By providing light reflection-promoting surfaces, absorption of light projected by the light-emitting device into the holder and absorption of the reflected light into the holder is prevented; whereas attenuation would otherwise take place. Reflection of light incident on the reflection-promoting wall surface is promoted. This assures that light received by the light-receiving device is maximized. Hence, an erroneous decision is prevented.

Preferably, the above-described light reflection-promoting surfaces are formed as inner surfaces of the holder, and may comprise painted inner surfaces of the holder. These inner surfaces of the holder may also comprise inner surfaces of auxiliary members inserted in the holder.

The aforementioned light-receiving device is preferably a split type that makes a decision as to whether the object is remote or near, based on the position at which light is received and the amount of received light. This prevents an erroneous decision where the object is at a rather short distance.

DETAILED DESCRIPTION OF THE PREFERRED EMBODIMENTS

Various embodiments of the present invention are described with reference to the drawings.

Figure 1:
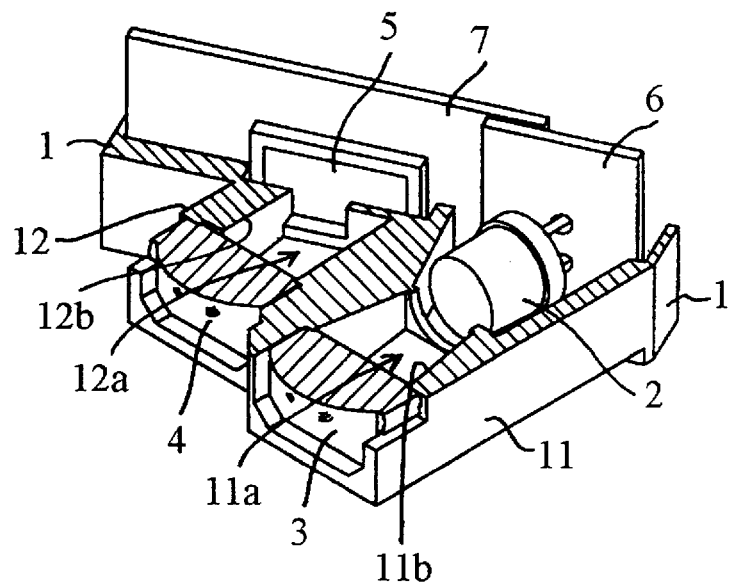
FIG. 1 is a perspective view illustrating one embodiment of a reflection-type optical sensor according to the present invention.
Figure 2:
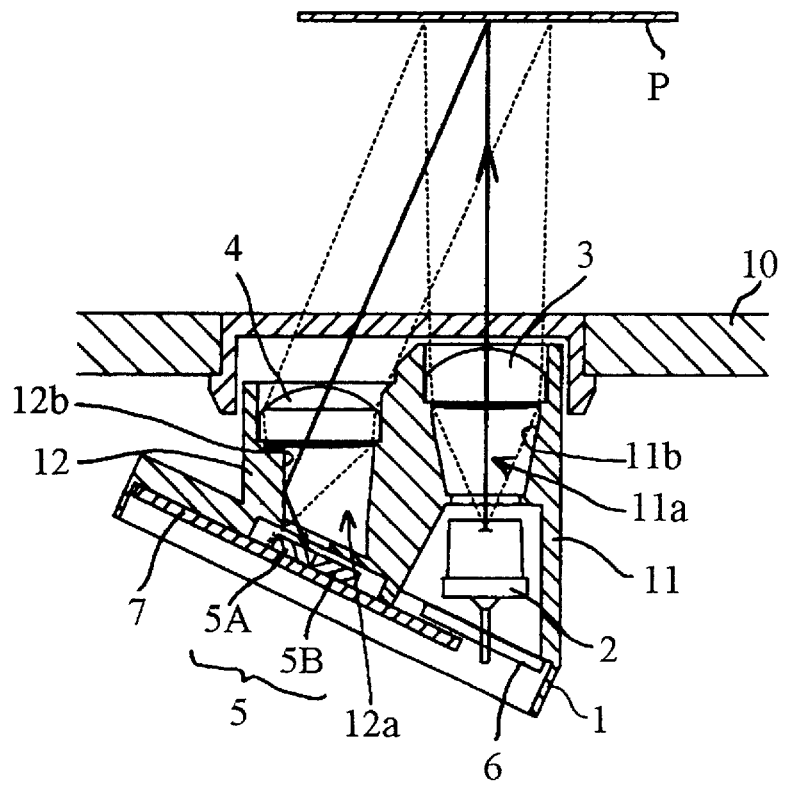
FIG. 2 is a plan view illustrating light reflection at a very short distance in the reflection-type optical sensor.

Referring to FIGS. 1 and 2, a holder 1 is made of a white synthetic resin such as polycarbonate resin and has a light-projecting portion 11 and a light-receiving portion 12. A light-projecting chamber 11a and a light-receiving chamber 12a that form light passages are formed inside the light-projecting portion 11 and the light-receiving portion 12, respectively. A light-emitting device 2 such as an infrared diode is disposed at the rear end of the inside of the light-projecting chamber 11a. A light-projecting lens 3 is disposed at the front end of the light-projecting chamber 11a. A light-receiving lens 4 is disposed at the front end of the inside of the light-receiving chamber 12a. A light-receiving device 5 is disposed at the rear end of the light-receiving chamber 12a. The light-emitting device 2 and the light-receiving device 5 are connected to circuit boards 6 and 7, respectively. The holder 1 is mounted to a mounting board 10.

The wall surfaces of the light-projecting chamber 11a and the light-receiving chamber 12a which are illuminated with light comprise light reflection-promoting surfaces 11b and 12b, respectively, for promoting the reflection of light. Since the wall surfaces illuminated with light comprise the entire wall surface of the light-projecting chamber 11a, the entire wall surface thereof comprises the light reflection-promoting surface 11b. In the light-receiving chamber 12a, the surface of the wall surface illuminated with light is the light reflection-promoting surface 12b. In FIG. 2, the left-hand wall surface of the light-receiving chamber 12a is the light reflection-promoting surface 12b.

Figure 5:
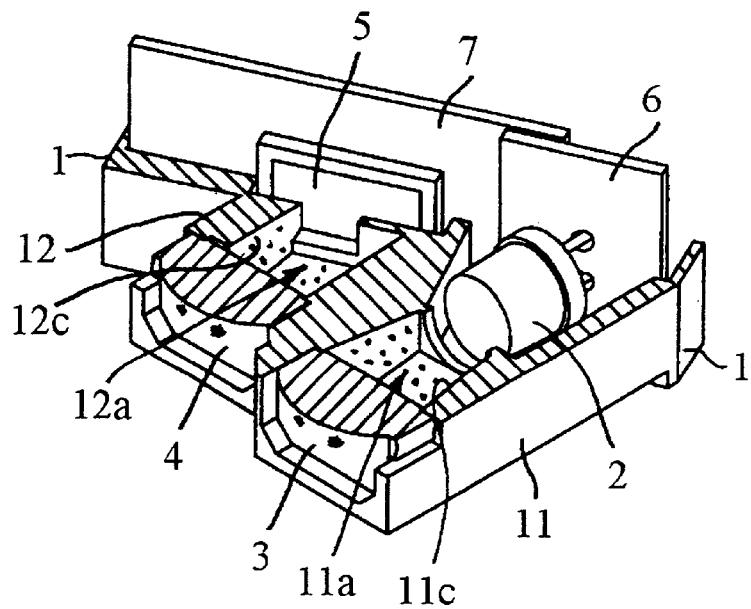
FIG. 5 is a perspective view illustrating a reflection-type optical sensor in a second embodiment of the present invention.

The light reflection-promoting surfaces 11b and 12b are formed as inner surfaces of the holder 1. Also, the light reflection-promoting surfaces 11b and 12b are formed as smooth surfaces. That is, light reflection-promoting surfaces 11b and 12b promote reflection of light because of surface processing. As shown in FIG. 5, they may be painted white, and light reflection-promoting surfaces 11c and 12c may be formed as painted surfaces that promote reflection of light. In this case, the number of degrees of freedom of the material and the color of the holder 1 is increased. In FIG. 5, substantially identical locations as their counterparts of FIG. 1 are indicated by the same reference numerals and will not be described below.

Because of the provision of the light reflection-promoting surfaces 11b, 12b (11c, 12c), if an object P to be detected is at a very short distance as shown in FIG. 2, when reflected light transmitted through the light-receiving lens 4 is again reflected off the light reflection-promoting surface 12b (12c), the reflection of light is promoted. Almost no loss of light takes place. This assures that adequate light is received by the light-receiving element 5A. Consequently, no misjudgment occurs.

Figure 3:
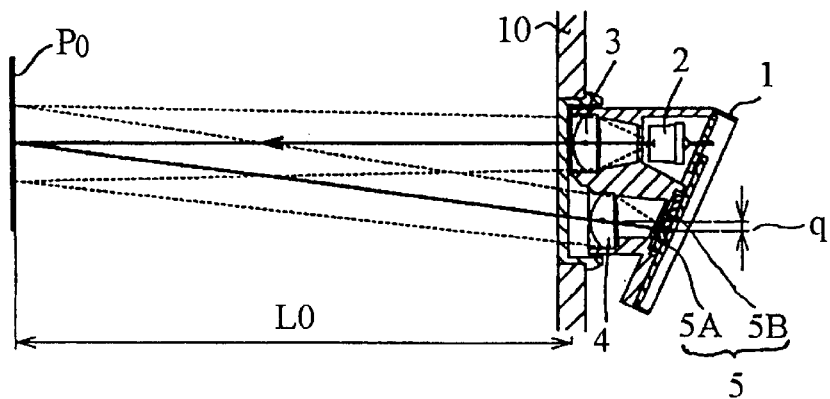
FIG. 3(a) is a reduced plan view illustrating reflection in a case in which an object to be detected is located at a reference position.
FIG. 3(b) is a reduced plan view illustrating reflection in a case in which an object to be detected is located remotely.
FIG. 3(c) is a reduced plan view illustrating reflection in a case in which an object to be detected is located nearby.
Figure 3:
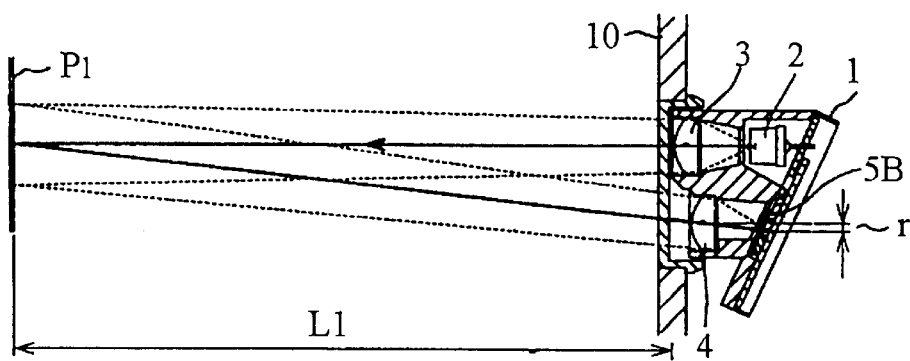
Figure 3:
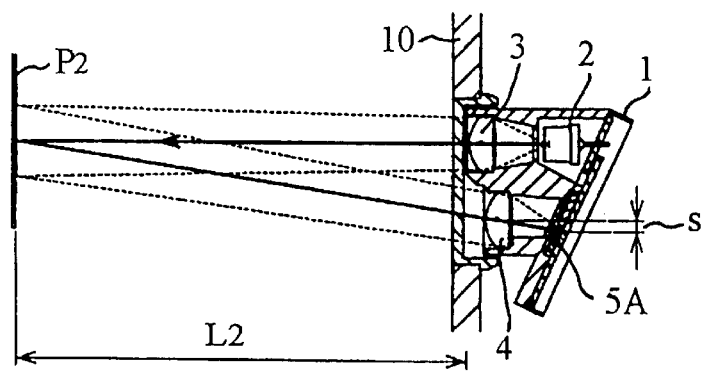

Preferably, the light-receiving device 5 is a split-type sensor that makes a decision as to whether the object is remote or near based on the position at which light is received and on the amount of received light. In the illustrated example, the light-receiving device is split into two light-receiving elements 5A and 5B bonded together along a given division line. This division line is next described. As shown in FIG. 3(a), where an object P0 to be detected is at a reference distance of L0 from the light-projecting lens 3, light emitted by the light-emitting device 2 is reflected by the detected object P. The reflected light passes through the center of the light-receiving lens 4. The position at which the light is received by the light-receiving device 5 is taken as the division line. One side (the lower side in FIG. 3(a)) of this division line is taken as the light-receiving element 5A, while the other side (the upper side of FIG. 3(a)) is taken as the light-receiving element 5B. This division line is at a distance of q from the axis passing through the center of the light-receiving lens 4.

FIG. 3(b) shows a case in which an object P1 to be detected is at a great distance of L1, greater than the reference distance L0, from the light-projecting lens 3. In this case, light emitted by the light-emitting device 2 is reflected by the detected object P1. The reflected light passes through the center of the light-receiving lens 4. The position at which the light is received by the light-receiving device 5 is at a distance of r from the axis. Since the distance r<distance q, the light is principally received by the light-receiving element 5B in this case.

FIG. 3(c) shows a case in which an object P2 to be detected is at a short distance of L2, shorter than the reference distance L0, from the light-projecting lens 3. In this case, light emitted by the light-emitting device 2 is reflected by the detected object P2. The reflected light passes through the center of the light-receiving lens 4. The position at which the light is received by the light-receiving device 5 is at a distance of s from the axis. Since distance s>distance q, the light is principally received by the light-receiving element 5A in this case. In the case of short distances, the reflected light strikes the light reflection-promoting surface 12b of the light-receiving chamber 12a and is reflected as shown in FIG. 2. The reflected light is received by the light-receiving element 5A. Since the reflection of the reflected light is promoted by the light reflection-promoting surface 12b, the reflected light is not attenuated as in the prior art technique. A sufficient amount of light is received reliably by the light-receiving element 5A.

Figure 4:
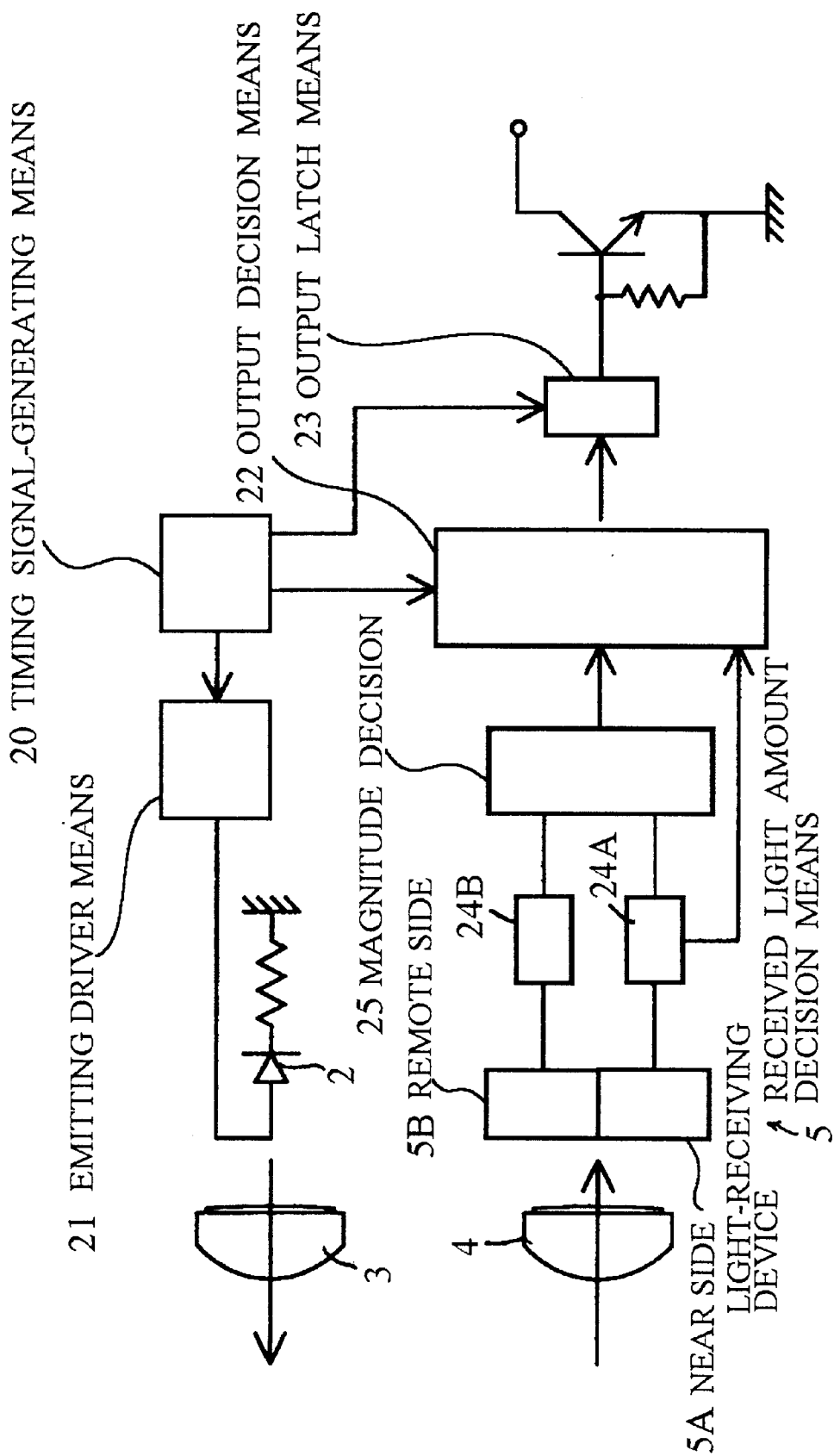
FIG. 4 is a block diagram illustrating the structure of the light-receiving apparatus for making a decision as to whether the distance to an object is large or small.

FIG. 4 is a block diagram showing a structure of a circuit for making a decision as to whether an object is remote or near. The circuit is formed on circuit boards 6 and 7. A timing signal-generating means 20 such as a clock generating circuit supplies a clock signal to a light-emitting device driver 21, an output decision means 22, and an output latch means 23. The light-emitting device driver means 21 is a conventional driver circuit responsive to the clock signal produced by the timing signal-generating means 20 to control the emission of light from the light-emitting device 2 at a desired timing. The amount of light received by light-receiving elements 5A and 5B is judged by received light amount decision means 24A and 24B, respectively, each of which produces an output voltage based on the magnitude of the currents output by the corresponding light-receiving elements 5A and 5B. The outputs of the received light amount decision means 24A and 24B is supplied to a magnitude decision means 25 and an output of the received light decision means 24A is also directly supplied to the output decision means 22.

The magnitude decision means 25 is a conventional circuit, such as an error amplifier or processor used for producing an output which varies depending upon the relative magnitude of the inputs from the received light amount decision means 24A and 24B. In the case of FIG. 3(b), for example, the magnitude decision means 25 judges that the amount of light received by the light-receiving element 5B is greater than the amount of light received by the light-receiving element 5A based on outputs of the received light amount decision means 24A and 24B, so that the output decision means 22 outputs a "remote" signal to the output latch means 23 indicating that the object is remotely located. The output latch means 23 comprises a latch circuit or memory device, where the output signal of the output decision means 22 is latched.

In the case of FIG. 3(c), the magnitude decision means 25 judges that the amount of light received by the light-receiving element 5A is greater than the amount of light received by the light-receiving element 5B and the output decision means 22 produces a "near" output signal to the output latch means 23, indicating that the object is located closely. The output latch means 23 latches the near signal.

In the case of FIG. 3(a), the magnitude decision means 25 judges that the amount of light received by the light-receiving element 5A is substantially equal to the amount of light received by the light-receiving element 5B. In this case, the magnitude decision means 25 produces a near output. The output decision means 22 produces a near output signal to the output latch means 23, where the signal is latched.

In the case of very short distances as shown in FIG. 2, the received light amount decision means 24A judges whether the amount of received light is in excess of a given level. Therefore, a near output signal is directly supplied to the output decision means 22 without the need to wait for a decision to be made by the magnitude decision means 25. The output decision means 22 produces a near output signal to the output latch means 23, where the signal is latched.

Where the reflection-type optical sensor is used for a toilet seat, if a remote output signal is latched, it is assumed that no one is seated. If a near output signal is latched, it is assumed that a person is seated. In this manner, if a near output signal is latched, the machine is controlled so that water may be ejected from the nozzle.

Figure 6:
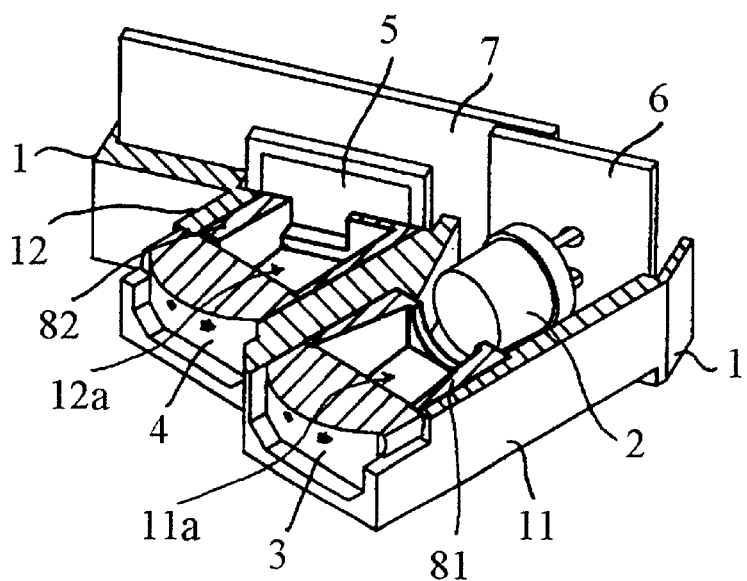
FIG. 6 is a perspective view illustrating a reflection-type optical sensor in a third embodiment of the present invention.
Figure 7:
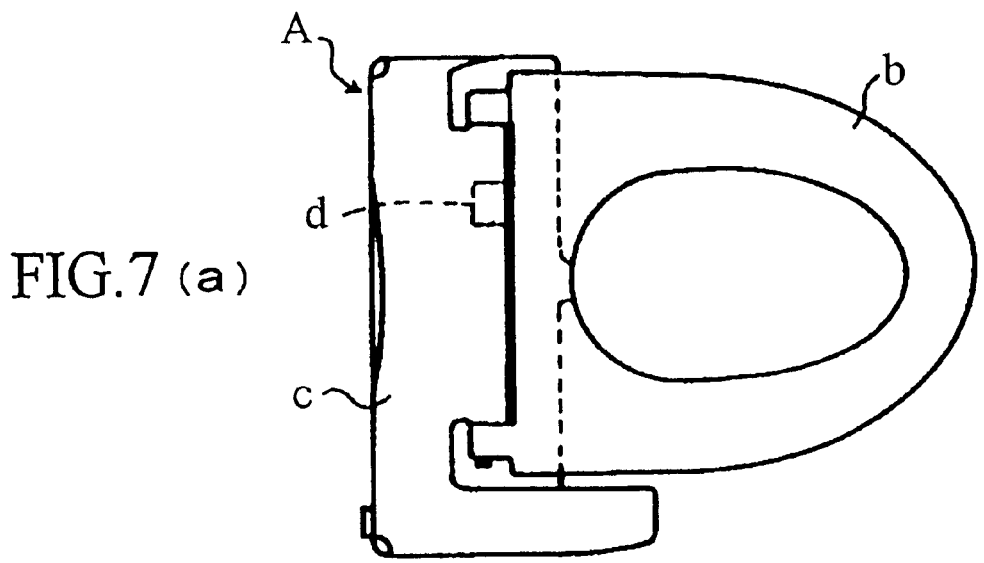
FIGS. 7(a) and 7(b) are a plan view and a side elevation, respectively, illustrating a case in which a reflection-type optical sensor is used in combination with a toilet seat.
Figure 7:
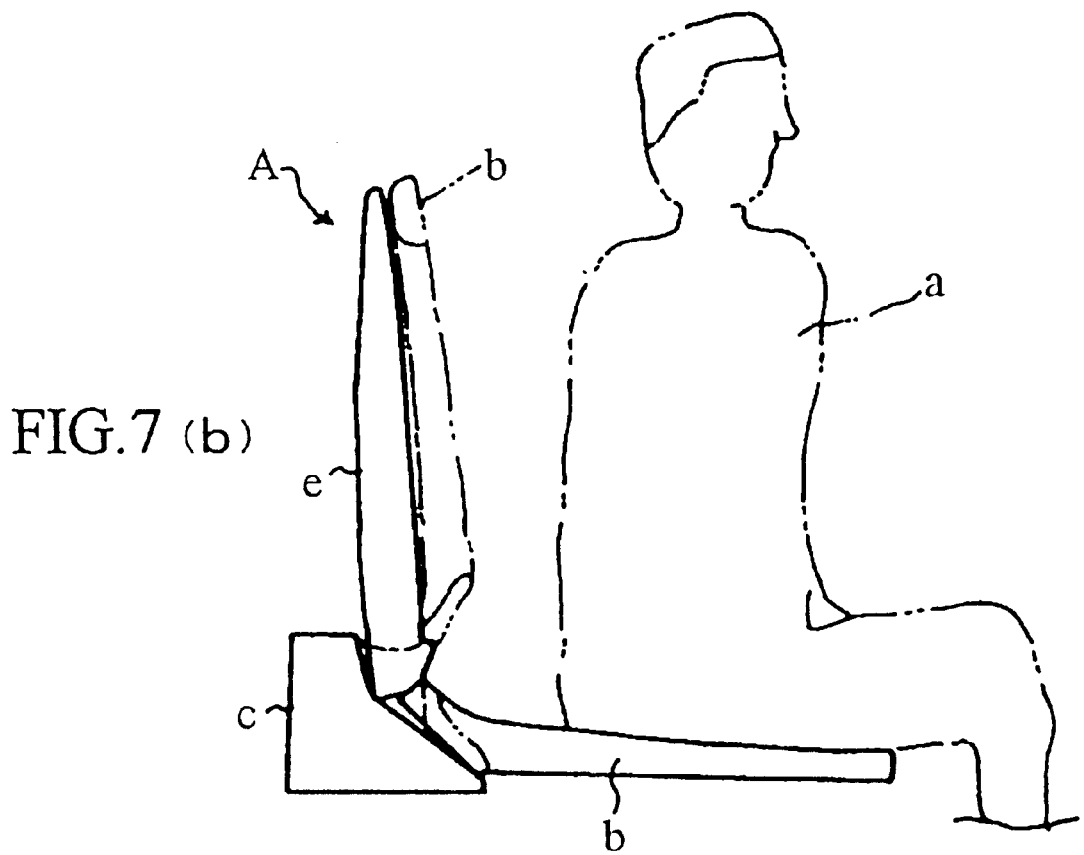

FIG. 6 shows a further embodiment of the present invention. Light-reflecting cylinders 81 and 82 acting as auxiliary members are inserted into given positions in a light-emitting portion 11 and a light-receiving portion 12 of a holder 1. Those of the wall surfaces of the light-emitting chamber 11a and the light-receiving chamber 12a which are illuminated with light are made of separate parts. In FIG. 6, those elements that are substantially identical with their counterparts of FIG. 1 are indicated by the same reference numerals and will not be described below.

The light-reflecting cylinders 81 and 82 acting as the auxiliary members may be made of white polycarbonate resin in the same way as the holder 1 described above. In this case, the color of the holder 1 is not limited to white. The light-reflecting cylinders 81 and 82 may be made of white polycarbonate resin, and the other portions may be made of a different color polycarbonate resin. That is, the holder 1 is molded in two colors. Furthermore, the holder 1 may be molded from a non-white polycarbonate resin, and the light-reflecting cylinders 81 and 82 may be made of sheets of aluminum and inserted into the holder 1. Additionally, the light-reflecting cylinders 81 and 82 may be made of sheets of aluminum, and these may be insert-molded during molding of the holder 1.

As described thus far, in accordance with the present invention, those of the wall surfaces of light-projecting chamber and light-receiving chamber in a holder which are illuminated with light are formed as light reflection-promoting surfaces for promoting the reflection of light. Therefore, attenuation of light emitted by a light-emitting device is suppressed by the light reflection-promoting surface of the light-projecting chamber. Attenuation of light reflected by an object to be detected is suppressed by the light reflection-promoting surface of the light-receiving chamber. Consequently, the light-receiving element receives a sufficient amount of light and erroneous detection can be avoided.

What is claimed is:

1. A reflection-type optical sensor comprising:
   a housing having inner wall surfaces defining a light-projecting chamber and a light-receiving chamber;
   a light-emitting device disposed in the light-projecting chamber for emitting light;
   a light-projecting lens disposed in the light-projecting chamber for projecting the emitted light toward an object;
   a light-receiving lens disposed in the light-receiving chamber for focusing reflected light from the object; and
   a light-receiving device disposed in the light-receiving chamber for receiving focused light from the light-receiving lens and outputting a signal depending upon the level of the focused light and the position of the object;
   wherein the light-projecting chamber and the light-receiving chamber have wall surfaces that receive incident light and are reflective surfaces for promoting the reflection of light so that reflected light incident on the wall surfaces is reflected and not absorbed by the wall surfaces; and wherein the housing is mounted when in use to a seat, and the light-projecting lens projects light toward a location at which a person would be located if sitting in the seat, such that the reflected light is focused by the light-receiving lens onto the wall surface of the light-receiving chamber, which reflects the focused light onto the light-receiving device to enable accurate detection of whether or not a person is sitting in the seat.

2. A reflection-type optical sensor according to claim 1; wherein the light-receiving device comprises a segmented photodetector for outputting a signal which varies depending upon the distance of the object based on the position and level of received light.

3. A reflection-type optical sensor according to claim 1; wherein the light reflection-promoting surfaces comprise the inner wall surfaces of the housing.

4. A reflection-type optical sensor according to claim 3; wherein the light-receiving device comprises a segmented photodetector for outputting a signal which varies depending upon the distance of the object based on the position and level of received light.

5. A reflection-type optical sensor according to claim 3; wherein the light reflection-promoting surfaces are colored to promote reflection of light.

6. A reflection-type optical sensor according to claim 1; wherein the light reflection-promoting surfaces comprise painted portions of the inner wall surfaces of the housing.

7. A reflection-type optical sensor according to claim 6; wherein the light-receiving device comprises a segmented photodetector for outputting a signal which varies depending upon the distance of the object based on the position and level of received light.

8. A reflection-type optical sensor according to claim 6; wherein the light reflection-promoting surfaces are colored to promote reflection of light.

9. A reflection-type optical sensor according to claim 1; wherein the light reflection-promoting surfaces comprise inner surfaces of auxiliary members inserted in the housing.

10. A reflection-type optical sensor according to claim 9; wherein the light-receiving device comprises a segmented photodetector for outputting a signal which varies depending upon the distance of the object based on the position and level of received light.

11. A reflection-type optical sensor according to claim 9; wherein the light reflection-promoting surfaces are colored to promote reflection of light.

12. A reflection-type optical sensor according to claim 11; wherein the light-receiving device comprises a segmented photodetector for outputting a signal which varies depending upon the distance of the object based on the position and level of received light.

13. A reflection-type optical sensor according to claim 9; wherein the auxiliary members have a white color.

14. A reflection-type optical sensor according to claim 13; wherein the holder has a color other than white.

15. A reflection-type optical sensor according to claim 9; wherein the auxiliary members are formed of a polycarbonate resin.

16. A reflection-type optical sensor according to claim 9; wherein the auxiliary members comprise light-reflecting cylinders inserted in the light-projecting chamber and the light-receiving chamber.

17. A reflection-type optical sensor according to claim 16; wherein the light-reflecting cylinders are formed of a polycarbonate resin.

18. A reflection-type optical sensor according to claim 9; wherein the auxiliary members are white in color.

19. A reflection-type optical sensor according to claim 18; wherein the housing has a color other than white.

20. A reflection-type optical sensor according to claim 9; wherein the auxiliary members are formed of sheets of aluminum inserted into the housing.

21. A reflection-type optical sensor according to claim 1; wherein the light reflection-promoting surfaces are colored to promote reflection of light.

22. A reflection-type optical sensor according to claim 1; wherein the light-receiving device comprises a segmented photodetector for outputting a signal which varies depending upon the distance of the object based-on the position and level of received light; and further comprising a circuit for determining whether the object is located near or far from the light-emitting means, the comprising received light amount decision means for receiving outputs from the segmented photodetector and outputting corresponding signals, magnitude decision means for producing an output signal depending upon the relative magnitude of outputs of the received light amount decision means, output decision means for determining whether the object is at a remote location or nearby based on the output signal of the magnitude decision means, and a latch for latching an output of the output decision means.

23. A reflection-type optical sensor according to claim 1; wherein the housing is formed of a synthetic resin.

24. A reflection-type optical sensor according to claim 1; wherein the housing is formed of a polycarbonate resin.

25. A reflection-type optical sensor according to claim 1; wherein the housing is white in color.

26. An optical sensor comprising: a housing; a light-emitting device disposed in the housing for emitting a light; a light-projecting lens disposed in the housing for projecting the emitted light toward an object; a light-receiving lens disposed in the housing for receiving reflected light from the object; and a light-receiving device disposed in the housing for receiving the light from the light-receiving lens and outputting a corresponding signal; wherein the housing has reflective inner wall surfaces for promoting the reflection of light so that reflected light incident on the inner wall surfaces is not absorbed by the wall surfaces; and wherein the housing is mounted when in use to a seat, and the light-projecting lens projects light toward a location at which a person would be located if sitting in the seat, such that the reflected light is focused by the light-receiving lens onto the reflective wall surface of the light-receiving chamber, which reflects the focused light onto the light-receiving device to enable accurate detection of whether or not a person is sitting in the seat.

27. An optical sensor according to claim 26; wherein inner wall surfaces of the housing are covered with a reflective coating to form the reflective surfaces.

28. An optical sensor according to claim 26; wherein reflective inserts are provided in an inner chamber of the housing to form the reflective inner wall surfaces.

* * * * *